Dec. 3, 1929.                O. SCHRIEVER                 1,738,397
          MODULATING CARRIER WAVE BY PHOTO ELECTRIC CURRENTS
                          Filed Sept. 7, 1927

INVENTOR
OTTO SCHRIEVER
BY
ATTORNEY

Patented Dec. 3, 1929

1,738,397

UNITED STATES PATENT OFFICE

OTTO SCHRIEVER, OF BERLIN, GERMANY, ASSIGNOR TO GESELLSCHAFT FÜR DRAHTLOSE TELEGRAPHIE M. B. H., OF BERLIN, GERMANY, A CORPORATION OF GERMANY

MODULATING CARRIER WAVE BY PHOTO-ELECTRIC CURRENTS

Application filed September 7, 1927, Serial No. 217,973, and in Germany October 15, 1926.

The amplfication of photo-electric currents is attended with considerable difficulties whenever their frequency band is very large such as is true, for instance, in picture telegraphy. Attempts have, therefore been made to discover ways and means to utilize the photo-electric currents first for the modulation of a carrier frequency or wave and to thereupon submit the modulated carrier wave to amplification, this being then an easy matter. However, inasmuch as photo-electric currents are mostly of very low value, the task of modulation is also associated in practice with serious difficulties.

Figure 1:
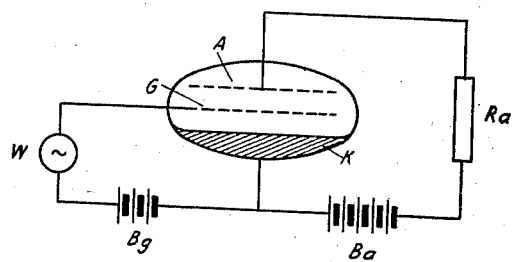
Figure 2:
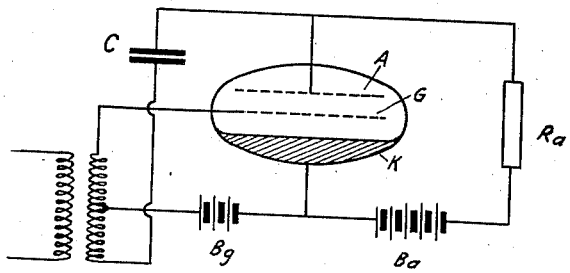

It is, therefore, an object of the present invention to obviate this drawback in a very simple manner. The ways and means suggested with this end in view shall be explained by making reference to the accompanying drawing wherein Fig. 1 illustrates an arrangement for supplying the carrier frequency to the photo cell and Fig. 2 is a modification of Fig. 1 illustrating a form of compensating means to be used in connection with Fig. 1.

The essential feature of the invention consists in that the photo-electric cell used for the purpose contains a grid-like electrode G in addition to the photo-sensitive cathode K and the light-permeable anode A. Between grid G and cathode K, if required, with the interposition of a battery $Bg$ supplying a biasing potential, there is connected an alternating current source W furnishing the carrier wave, while the anode is united through an alternating current resistance $Ra$ and anode $Ba$ with the cathode. When irradiated, the alternating current acting upon the grid results in an alternating current in the anode circuit whose ampiltude curve varies in conformity with the intensity of the illumination. The anode current, modified in the same manner, of the photo-electric cell can be amplified in a very easy and usual manner.

When very high carrier frequencies are employed, the internal capacity of the photoelectric cells between anode and grid is liable to manifest itself in a very harmful way in so far as the anode alternating current does not disappear entirely in the absence of illumination. This capacitive "dark current" may be compensated by any of the well known neutralizing connections for amplifier tubes, for instance, in a manner as diagrammatically indicated in Fig. 2 by that the anode is supplied by way of the condenser C with an equal and opposite alternating current potential compared with the current flowing by way of the internal cell capacity.

In cases in which a residual alternating current is desired in the anode circuit, such as in the case of synchronizing purposes in transmission work, condenser C may be used for ampltitude regulation of the same.

The relative disposition of the three electrodes need not be chosen in a way as shown in Figs. 1 and 2. For instance, grid and anode may be mounted upon opposite sides of the cathode.

The form of the photo-electric cells must be adapted to the requirements and applications thereof.

Having thus described my invention what I claim is:

1. A method of modulating a carrier frequency by means of a photo cell including an anode, a light sensitive cathode, and a grid electrode, which comprises supplying the carrier frequency across the grid cathode circuit, subjecting the light sensitive cathode to various intensities of illumination and producing in the anode cathode circuit of said cell a modulated carrier whose amplitude curve varies in accordance with the light intensities reaching said light sensitive cathode.

2. An arrangement for modulating a carrier wave, which comprises, a light sensitive photo cell, including a light permeable anode, a light sensitive cathode, and a grid electrode, means for supplying the carrier frequency to the grid cathode circuit of said cell, means for subjecting said cell to various light intensities for modulating said carrier appearing in the output circuit of said cell in accordance with the variations in light intensities reaching said photo cell.

3. An arrangement for modulating a carrier wave by photo-electric currents within a photo cell, a pho-electric cell including an anode, a light sensitive cathode, and a grid, means for supplying a carrier frequency to the grid cathode circuit of said cell, and means for compensating for the alternating current flowing through the internal capacity of said photo cell, from said control electrode to said anode in such a manner that during conditions of non-illumination no alternating current will flow in the said anode circuit.

4. An arrangement for modulating a carrier wave directly by variations in light intensity, which comprises, a light sensitive photo cell having a light permeable anode member, a light sensitive cathode member, and a control electrode, means for supplying a carrier frequency across the circuit including the control electrode and the cathode member of said cell, means provided by varying light intensities reaching the light sensitive cathode member of said cell for modulating the impressed carrier frequency appearing in the anode cathode circuit of said cell in accordance with variations in light intensities reaching the light sensitive cathode, and means provided by a neutralizing circuit between the anode and control grid connection for neutralizing carrier frequency current flow in the anode cathode circuit of said cell at periods when the said light sensitive cathode is uninfluenced by light.

5. An arrangement for modulating a carrier wave by photo-electric currents within a photo cell which comprises a photo electric cell, including, a light sensitive cathode member, an anode member, and a control grid member, means for supplying a carrier frequency across the grid cathode circuit of said cell, means provided by variations in light and shade reaching the said light sensitive cathode member for modulating the carrier frequency appearing in the anode circuit of said cell, a capacity member and a neutralizing inductive coupling connecting the anode member of said cell with said carrier frequency for neutralizing carrier current flow appearing in the anode cathode circuit during periods when there is no illumination on the light sensitive cathode member.

6. The method of modulating a carrier frequency by means of a photo cell including an anode, a light sensitive cathode and a control grid electrode member, which comprises, supplying a carrier frequency across the grid cathode circuit, subjecting the light sensitive cathode to various intensities of illumination, producing in the anode cathode output circuit of the cell a modulated carrier frequency whose amplitude curve varies in accordance with the variations in light intensities reaching the said light sensitive cathode, and neutralizing carrier frequency currents appearing in the anode cathode output circuit during periods when the said light sensitive cathode is uninfluenced by light intensities.

OTTO SCHRIEVER.